April 28, 1931.   E. J. BUDLONG   1,803,309
PISTON RING
Original Filed May 29, 1928   2 Sheets-Sheet 1
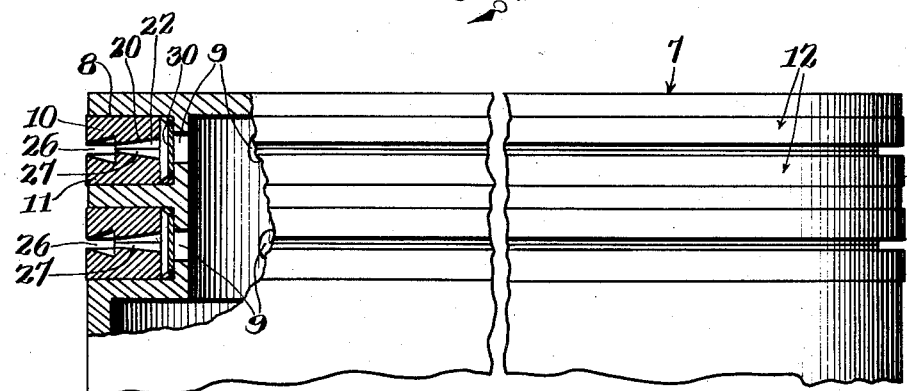
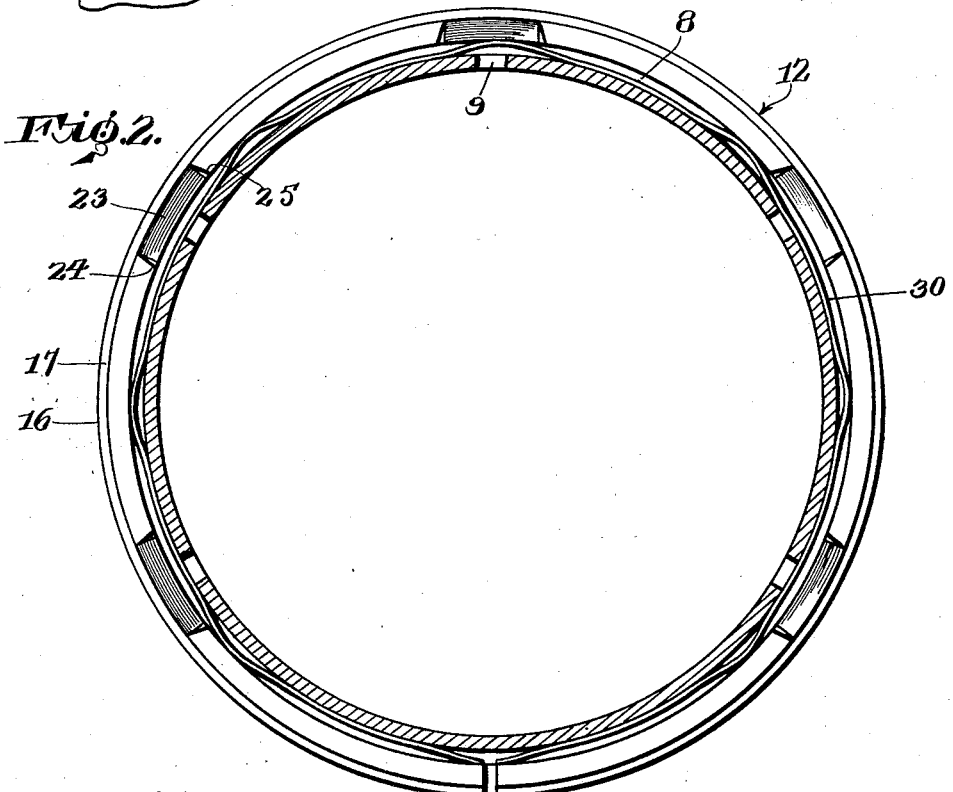
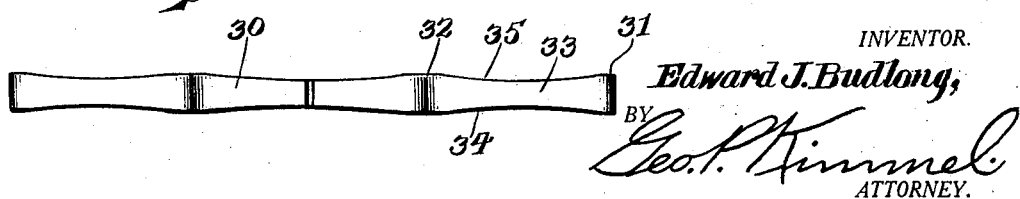
INVENTOR.
Edward J. Budlong,
BY Geo. P. Kimmel
ATTORNEY.

April 28, 1931.     E. J. BUDLONG     1,803,309
PISTON RING
Original Filed May 29, 1928    2 Sheets-Sheet 2
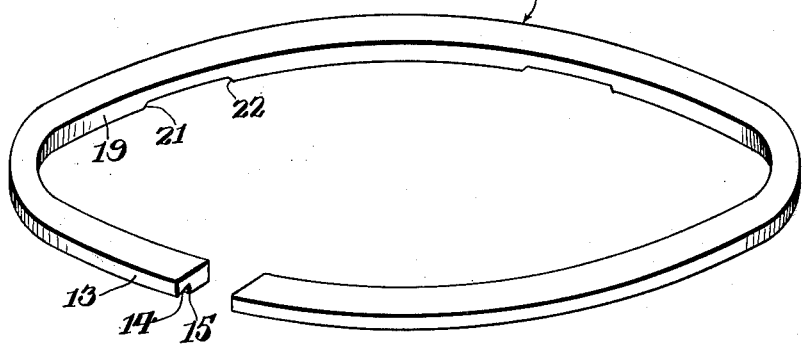
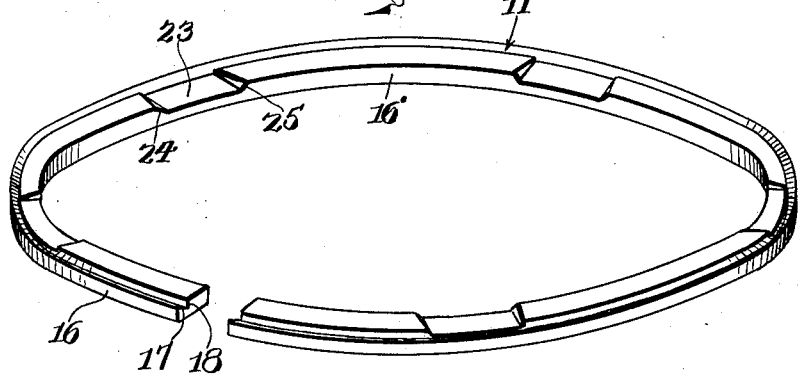
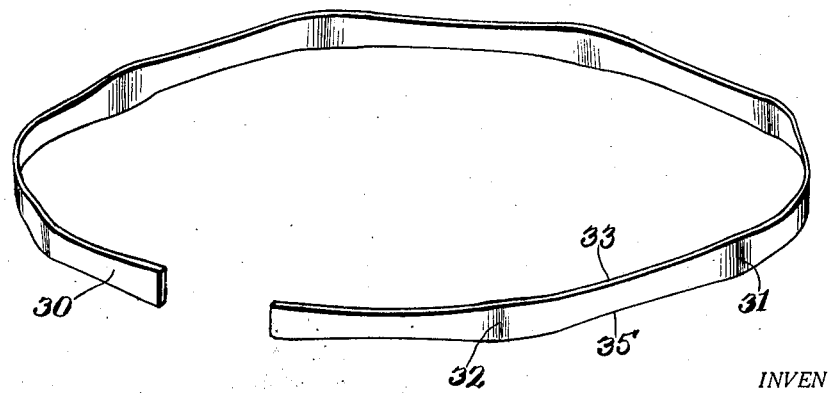
INVENTOR.
Edward J. Budlong,
BY
Geo. P. Kimmel
ATTORNEY.

Patented Apr. 28, 1931

1,803,309

UNITED STATES PATENT OFFICE

EDWARD J. BUDLONG, OF HANFORD, CALIFORNIA, ASSIGNOR TO BUDLONG & FUNCHESS MOTOR PRODUCTS CO., OF HANFORD, CALIFORNIA

PISTON RING

Application filed May 29, 1928, Serial No. 281,434. Renewed December 2, 1929.

This invention relates to piston rings and has for its object to provide, in a manner as hereinafter set forth, a ring of such character for overcoming the pumping of lubricant or oil into the combustion chamber of the engine, as well as automatically compensating for the wear between the piston and cylinder walls.

Another object of the invention is to provide, in a manner as hereinafter set forth, for trapping the excess lubricant or oil adhering to the cylinder walls and returning the accumulated excess to the crank case.

A further object of the invention is to provide, in a manner as hereinafter set forth, a piston ring which is simple in its construction and arrangement, automatic in its operation, strong, durable and thoroughly efficient in its intended use, easily positioned within the peripheral grooves of the piston and inexpensive to manufacture.

With the foregoing and other objects in view, the invention consists of a novel construction, combination and arrangement of parts, as hereinafter more specifically described and illustrated in the accompanying drawings, wherein is shown an embodiment of the invention, but it is to be understood that changes, variations and modifications may be resorted to which fall within the scope of the claims hereunto appended.

In the drawings wherein like reference characters denote corresponding parts throughout the several views:—

Figure 1 is a fragmentary view in sectional elevation of a piston showing the piston ring in accordance with this invention assembled therewith.

Figure 2 is a sectional plan of the piston showing the adaptation therewith of the lower section of a piston ring in accordance with this invention.

Figure 3 is a side elevation of a spreader ring employed in connection with the ring.

Figure 4 is a perspective view of the upper section of a piston ring in accordance with this invention.

Figure 5 is a perspective view of the lower section of a piston ring in accordance with this invention.

Figure 6 is a perspective view of the spreader.

Referring to the drawings in detail, 7 denotes a piston provided with annular, peripheral spaced grooves 8 of U-shaped cross-section. The piston is furthermore provided with a plurality of rows of circumferentially spaced openings 9 extending radially through the piston wall. Each row of openings 9 communicates with the inner end of the groove and provides for conducting the entrapped lubricant from the groove to the hollow interior of the piston from where said lubricant flows back into the crank case not shown in the drawings.

A piston ring in accordance with this invention comprises a pair of complementary resilient, split, metallic leading and follower sections 10, 11 respectively, arranged in opposed relation when assembled within a peripheral groove 8 to form the body portion of the ring designated generally at 12.

The leading section 10 has its follower face cut away from the outer edge 13 of said sections to a point outwardly with respect to the median thereof to form an angular walled groove having one wall 14 thereof extending inwardly and inclining towards the leading face of the section and terminating at its inner end in the forward end of the other wall 15 of the groove. The said wall 15 extends from the follower face of the section towards the leading face of the latter, and in cross section, is disposed in parallelism to the edge 13.

The follower section 11 has its leading face cut away from its outer edge 16 of said section to a point outwardly with respect to the median thereof to form an angular walled groove having one wall 17 thereof extending inwardly and inclining towards the follower face of the section and terminating at its inner end in the rear end of the other wall 18 of the groove. The said wall 18 extends from the leading face of the section towards the follower face thereof and in cross section is disposed in parallelism to the edge 16.

The follower face of section 12, at spaced intervals, is formed with transverse grooves extending from the wall 15 to the inner edge 19 of said section. Each groove includes a forward wall 20 and a pair of sides 21, 22. The wall 20 inclines in a direction towards the leading face of the section and the side walls gradually increase in width from outer towards inner ends.

The leading face of section 13 at spaced intervals is formed with transverse grooves extending from the wall 18 to the inner edge 16' of said section. Each groove includes a rear wall 23 and pair of side walls 24, 25. The wall 23 inclines in a direction towards the follower face of the section and the side walls gradually increase in width from their outer towards their inner ends.

When sections 12, 13 are arranged in opposed relation to provide the ring body 11, the follower face of section 12 abuts the leading face of section 13 and with the groove of one section registering with the grooves of the other section to provide a continuous annular trap 26 and a series of circumferentially spaced discharge channels 27. The trap 26 is of frusto-triangular contour and each channel 27 is of frusto-pyramidal contour. The smaller end of the channel communicates with the base of the trap. In transverse section the trap is of less length than the groove.

A spreader ring is indicated at 30 and is formed of a flat band of spring steel split transversely and bent in the shape of a polygon. The portions of the band between the corners 31 and 32 of the polygon taper in opposite directions from the center thereof and are disposed on a slight concave curve throughout to form oppositely disposed concave edge portions 34, 35. The concaved edge portions provide clearances between the groove walls and the edges of the spreader for the passage of the lubricant to the opening 9 in the piston wall.

In the assembly of the ring the spreader 30 is placed against the inner wall of the groove 8. The leading section 10 is placed on the follower section 11 with the trap grooves 26 and the discharge channel grooves 27 in registration. The spaced channel grooves 27 should be placed as near as possible in radial alignment with the piston outlet openings 9 and then the ring is inserted in the piston groove 8 with the rear end thereof abutting the spreader 30. The reaction at the corners of the polygonal spreader 30 resisting the force to curve them, exerts an outward pressure on the piston ring which maintains a tight joint between the outer face of said ring and the cylinder wall. As the piston moves in the cylinder the excess lubricant adhering to the cylinder wall is scraped therefrom and collected in the trap 26. The lubricant flows from trap 26 into the discharge channel 27, past the concave edge portion of the spreader ring 30, through the opening 9 in the cylinder wall and back to the crank case.

What I claim is:—

1. A piston ring section comprising a split, resilient, annular body provided with a groove in one face thereof, one of the walls of said groove extending inwardly from the outer edge of said body at an inclination, another wall of said groove disposed in parallelism with said outer edge, said face further formed with spaced transverse grooves extending from the last mentioned wall to said inner edge, and said transverse grooves gradually decreasing in depth toward said outer edge.

2. A piston ring section comprising a split, resilient, annular body provided with a groove in one face thereof, one of the walls of said groove extending inwardly from the outer edge of said body at an inclination, said wall terminating forwardly of the median of said body, and another wall of said groove disposed in parallelism with said outer edge, said face further formed with spaced transverse grooves extending from the last mentioned wall to the inner edge of said section, said transverse grooves gradually decreasing in depth toward said outer edge, and said transverse grooves of greater length than the cross sectional length of said first mentioned groove.

3. A piston ring section comprising a split, resilient, annular body provided with a groove in one face thereof, one of the walls of said groove extending inwardly from the outer edge of said body at an inclination, said wall terminating short of the inner edge of said body, and another wall of said groove disposed in parallelism with said outer edge, said face further formed with spaced transverse grooves extending from the last mentioned wall to said inner edge, transverse grooves gradually decreasing in depth toward said outer edge, and the inner end of said inclined wall terminating in the inner end of the other of said walls.

4. A piston ring section comprising a split, resilient, annular body provided with a groove in one face thereof, one of the walls of said groove extending inwardly from the outer edge of said body at an inclination, said wall terminating forwardly of the median of said body, and another wall of said groove disposed in parallelism with said outer edge, said face further formed with spaced transverse grooves extending from the last mentioned wall to the inner edge of said section, said transverse grooves gradually decreasing in depth toward said outer edge, said transverse grooves of greater length than the cross sectional length of said first mentioned groove, and the inner end of said inclined wall terminating in the inner end of the other of said walls.

5. A piston ring comprising a body portion formed of a pair of oppositely disposed abutting split, resilient, annular sections, each of said sections consisting of a split, resilient, annular body provided with a groove in one face thereof, one of the walls of said groove extending inwardly from the outer edge of said body at an inclination, said wall terminating short of the inner edge of said body, and another wall of said groove disposed in parallelism with said outer edge, said face further formed with spaced transverse grooves extending from the last mentioned wall to said inner edge and transverse grooves gradually decreasing in depth toward said outer edge, the grooves of said sections registering with each other when said sections are in abutting relation to provide a lubricant trap and discharge channels for the latter.

6. A piston ring comprising a body portion formed of a pair of oppositely disposed abutting split, resilient, annular sections, each of said sections consisting of a split, resilient, annular body provided with a groove in one face thereof, one of the walls of said groove extending inwardly from the outer edge of said body at an inclination, said wall terminating forwardly of the median of said body, and another wall of said groove disposed in parallelism with said outer edge, said face further formed with spaced transverse grooves extending from the last mentioned wall to the inner edge of said section, said transverse grooves gradually decreasing in depth toward toward said outer edge, said transverse grooves of greater length than the cross sectional length of said first mentioned groove, and the grooves of said sections registering with each other when said sections are in abutting relation to provide a lubricant trap and discharge channels for the latter.

7. A piston ring comprising a split, resilient, annular body formed of two like, abutting opposed sections, the opposed faces of said sections being provided with coacting means to form a frusto-triangular shaped trap opening at the outer edge of said body, and the opposed faces of said sections being further provided with coacting means to form a plurality of spaced discharge channels for said trap, said channels being of frusto-pyramidal shape and opening into the base of the trap and discharging at the inner edge of said body.

8. A piston ring comprising an annular body formed of a leading and a follower section, said sections arranged in opposed relation and each being expansible, said sections having coacting means on the opposed faces thereof to provide a trap having its entrance at the outer edge of said body, said sections further having coacting means on the opposed faces thereof to provide spaced discharge channels leading from said trap to the inner edge of said body, said trap being coextensive with the outer edge of said body and gradually increasing in height from its entrance, and each of said channels gradually increasing in height toward the inner edge of said body.

9. A piston ring comprising an annular body formed of a leading and a following section, said sections arranged in opposed relation and each being expansible, the outer edge of each section being of less width than the inner edge thereof, said leading section having the outer marginal portion of its follower face grooved, said follower section having the outer marginal portion of its leading face grooved, said grooves coacting to provide a trap having its entrance at the outer edge of said body, said leading section having its follower face provided with spaced transverse grooves, said following section having its leading face provided with spaced transverse grooves, the transverse grooves in said faces coacting to provide discharge channels leading from said trap to the inner edge of said body, said trap gradually increasing in height from its outer to its inner end, said discharge channels gradually increasing in height from said trap to the inner edge of said body.

10. A piston ring comprising an annular body formed of a leading and a follower section, the follower face of the leading section opposing the leading face of the follower section, each of said sections being expansible, said sections having the opposed faces thereof provided with coacting means to provide an inwardly extending trap having its entrance at the outer edge of said body, said trap terminating short of the inner edge of said body, said sections having the opposed faces further provided with coacting means forming discharge means for the trap, said discharge means leading from the inner end of the trap to the inner edge of said body, said trap gradually increasing in height from its entrance end toward its inner end, said discharge means gradually increasing in height from the inner end of the trap toward the inner end of said body.

11. A piston ring comprising an annular body formed of a pair of like expansible sections, each having its outer edge of less width than its inner edge, said sections having the opposed faces thereof provided with coacting, oppositely disposed means to provide an annular trap opening at the outer edge of said body, said sections further having the opposed faces thereof providing coacting, oppositely disposed means to provide spaced, diametrically extending discharge channels leading from the inner end of the trap to the inner edge of said body, said trap gradually increasing in height inwardly, said channels gradually increasing in height towards the inner edge of said body.

12. A piston ring comprising an annular body formed of a pair of oppositely disposed, aligning, expansible sections, each of said sections being annular and having its outer edge of less width than its inner edge, each of said sections having its outer marginal portion of one face thereof grooved, the grooves on said sections coacting to provide a trap having its entrance at the outer edge of said body, said trap gradually increasing in height inwardly from the outer edge of said body, the said face of each of said sections further formed with spaced, radially disposed transverse grooves, the transverse grooves in said faces coacting to provide discharge channels leading from the trap to the inner edge of said body, said channels gradually increasing in height from the inner end of the trap to the inner edge of said body, and said trap opening at a point interposed between opposed walls thereof and at spaced intervals into the intake ends of said channels.

13. A piston ring comprising an annular body formed of a pair of expansible sections, said body provided with a trap opening at its outer edge and terminating short of its inner edge, said trap gradually decreasing in height from its inner end to the outer edge of said body, said body formed with spaced, transversely extending channels communicating with and leading from the inner end of the trap to the inner edge of said body, said channels gradually increasing in height from the trap to the inner edge of said body.

14. A piston ring comprising an annular body formed of a pair of expansible sections, said body provided with a trap opening at its outer edge and terminating short of its inner edge, said trap gradually decreasing in height from its inner end to the outer edge of said body, said body formed with spaced, transversely extending channels communicating with and leading from the inner end of the trap to the inner edge of said body, said channels gradually increasing in height from the trap to the inner edge of said body, the width of the outer edge of each of said sections being less than the inner edge thereof.

15. A piston ring comprising an annular body formed of a pair of expansible sections, said body provided with a trap opening at its outer edge and terminating short of its inner edge, said trap gradually decreasing in height from its inner end to the outer edge of said body, said body formed with spaced, transversely extending channels communicating with and leading from the inner end of the trap to the inner edge of said body, said channels gradually increasing in height from the trap to the inner edge of said body, the outer edge of each of said sections being uniform and of less width than that portion of the inner edge of said sections between the discharge ends of said channels.

16. A piston ring comprising an annular body formed of a pair of expansible sections, said body provided with a trap opening at its outer edge and terminating short of its inner edge, said body formed with spaced, transversely extending channels leading from the inner end of the trap to the inner edge of said body, said channels gradually increasing in height from the inner end of said trap to the inner edge of said body.

17. A piston ring comprising an annular body formed of a pair of expansible sections, said body provided with a trap opening at its outer edge and terminating short of its inner edge, the mouth of the trap being coextensive with said outer edge, said trap gradually decreasing in height from its inner end to said outer edge of said body, and said body formed with spaced, radially disposed channels leading from the inner end of the trap to the inner edge of said body.

18. A piston ring for mounting in a piston groove comprising an annular body formed of a pair of split annular sections, the follower face of the forward section opposing the leading face of the rear section, each section having its outer edge of less axial length than its inner edge, said sections having the opposed faces thereof grooved to provide in connection with the outer edges thereof trap forming means, and said sections having the opposed faces thereof formed with transversely disposed cutouts having inclined side walls and providing oil conducting channels leading to said inner edges.

In testimony whereof I affix my signature hereto.

EDWARD J. BUDLONG.